No. 763,535. PATENTED JUNE 28, 1904.
R. ALGRIN.
EXPLOSION MOTOR.
APPLICATION FILED SEPT. 20, 1901.
NO MODEL. 7 SHEETS—SHEET 2.
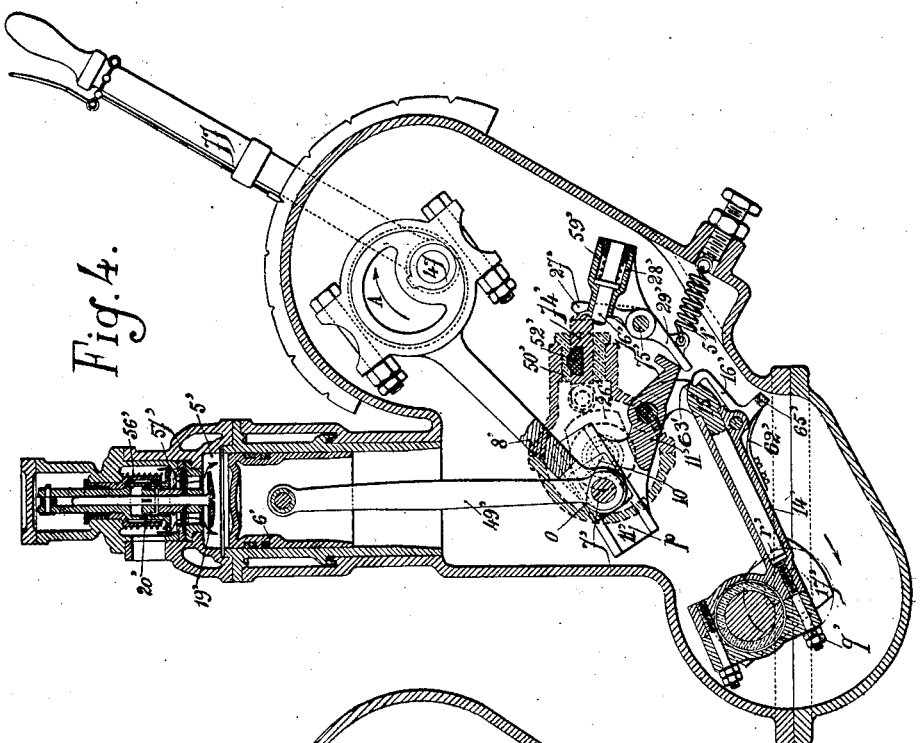
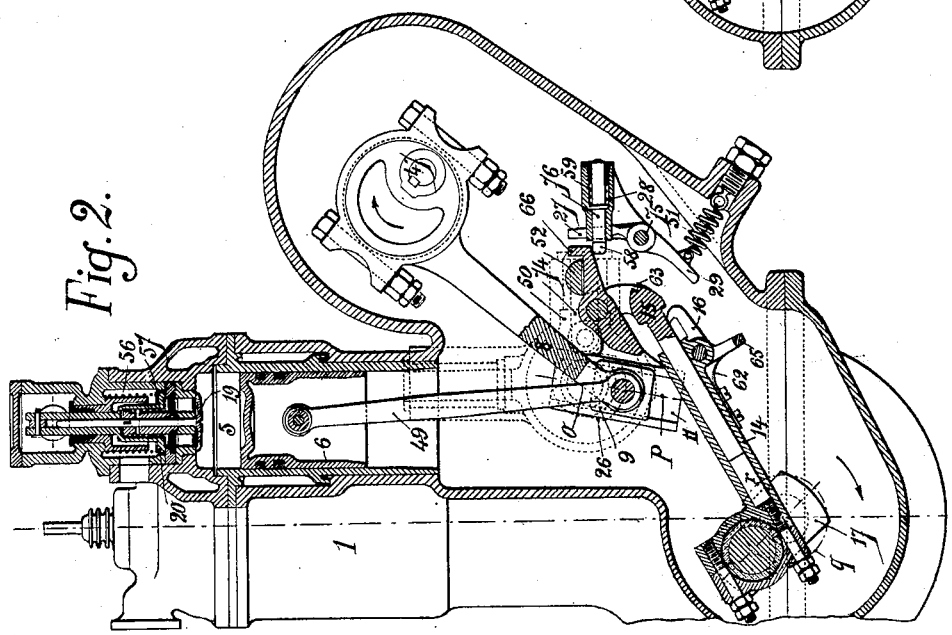

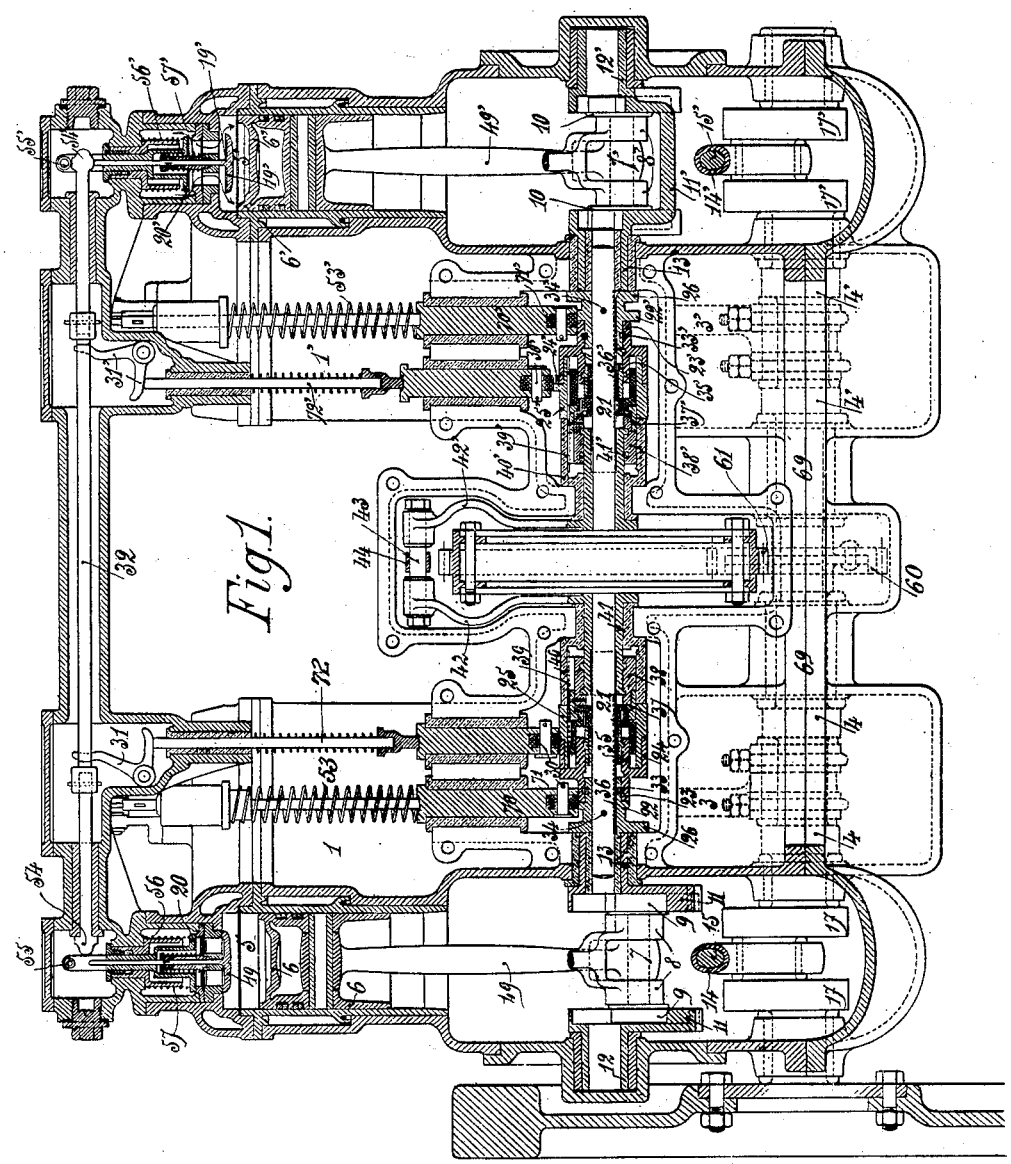

No. 763,535. PATENTED JUNE 28, 1904.
R. ALGRIN.
EXPLOSION MOTOR.
APPLICATION FILED SEPT. 20, 1901.
NO MODEL. 7 SHEETS—SHEET 3.

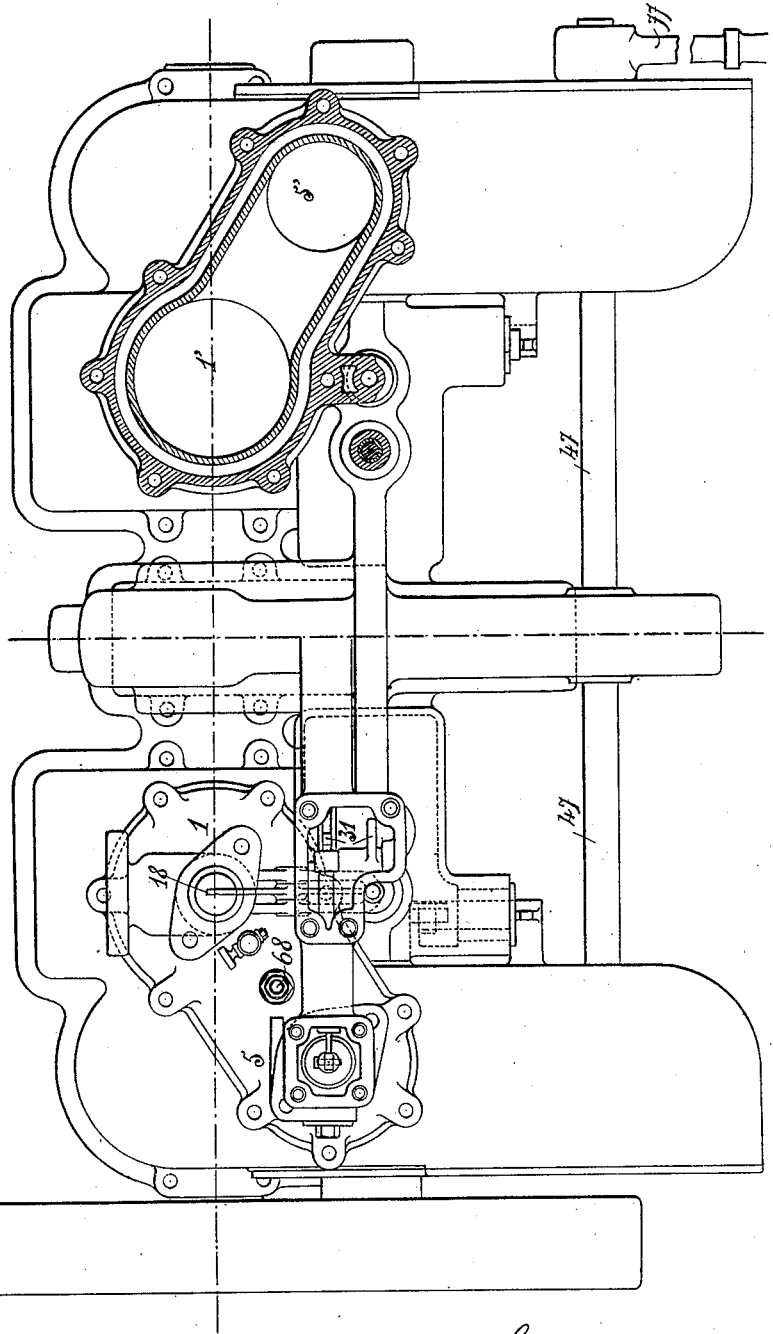

No. 763,535. PATENTED JUNE 28, 1904.
R. ALGRIN.
EXPLOSION MOTOR.
APPLICATION FILED SEPT. 20, 1901.
NO MODEL. 7 SHEETS—SHEET 6.

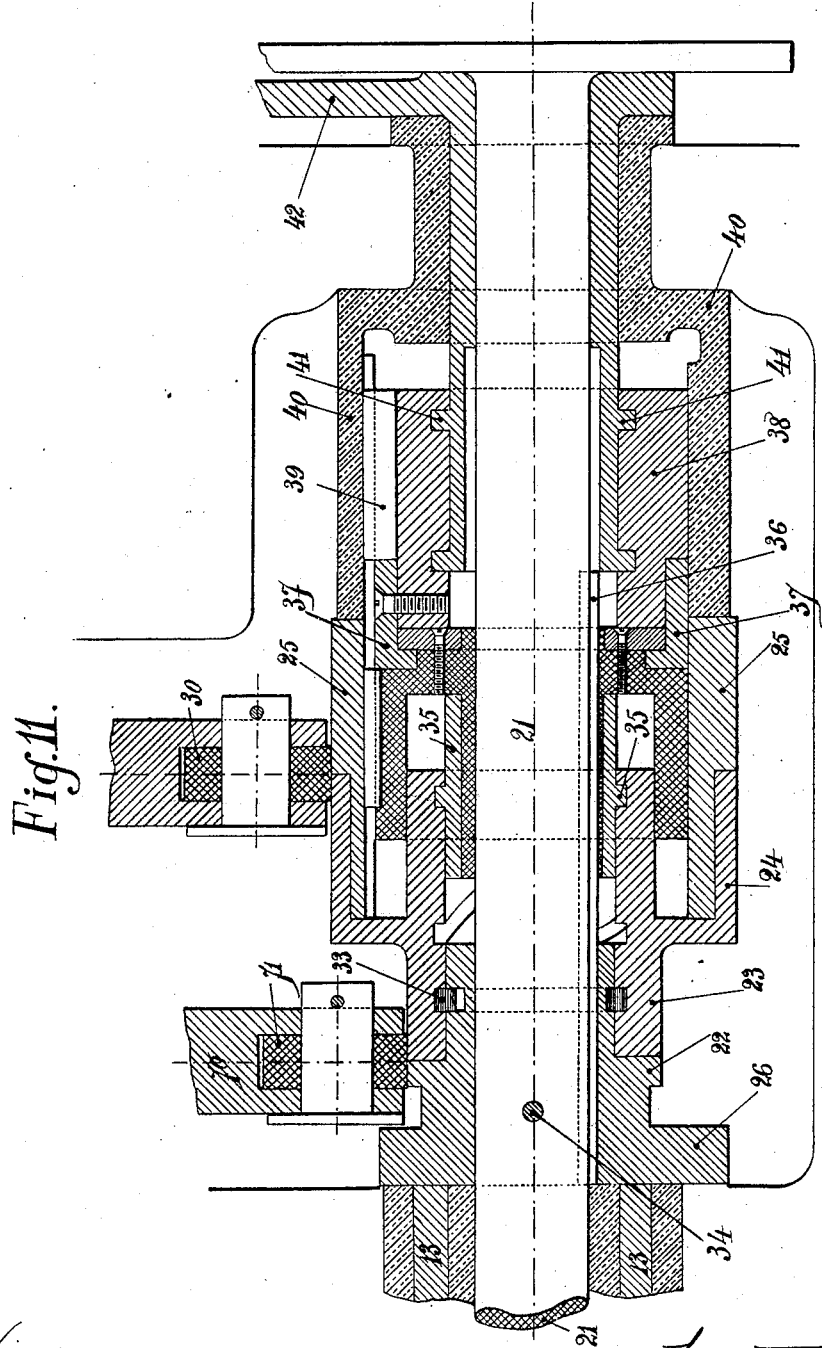

No. 763,535. Patented June 28, 1904.

UNITED STATES PATENT OFFICE.

RENÉ ALGRIN, OF PARIS, FRANCE.

EXPLOSION-MOTOR.

SPECIFICATION forming part of Letters Patent No. 763,535, dated June 28, 1904.

Application filed September 20, 1901. Serial No. 75,815. (No model.)

*To all whom it may concern:*

Be it known that I, RENÉ ALGRIN, civil engineer, of 7 Rue des Bauches, city of Paris, Republic of France, have invented new and useful Improvements in and Connected with Explosion-Motors, which improvements are fully set forth in the following specification.

This invention for improvements in explosion-motors relates to four-stroke-cycle explosion-motors, the characterizing features of which are as follows: first, a separate compression-chamber into which the explosive mixture is introduced, consisting of a small cylinder parallel to the working cylinder and communicating with it, the volume of which compression-chamber can be varied with the effect of producing corresponding variations in the power of the motor; second, a means whereby the clearance of the working piston and of the compression-piston is reduced theoretically to zero and practically to a space of no account when these pistons arrive at their upper dead-centers, which they do simultaneously, thus expelling totally the products of combustion; third, a means whereby the advance of the exhaust is made inversely proportional to the compression-chamber volume—that is to say, making the duration of the explosion-stroke vary proportionally to the variations in the volume of the compression-chamber—this being effected by changing the instant at which the exhaust-valve is opened, having for its object to obviate the working piston having to work against the pressure of the atmosphere; fourth, a means whereby the period during which the admission is open is made directly proportional to the volume of the compression-chamber, thus rendering the compression constant; fifth, an arrangement consisting in the application of the non-reversibility of an eccentric to effect these various objects—viz., these variations in the working conditions of the motor without stopping it and at any moment during the different phases of the cycle either by hand, as required by the engine-tender, or by the action of an automatic governor. The general arrangement of these mechanisms, forming the distinguishing features of the motor in question, is illustrated in Figures 1 to 11 of the accompanying drawings, in which—

Figure 6:
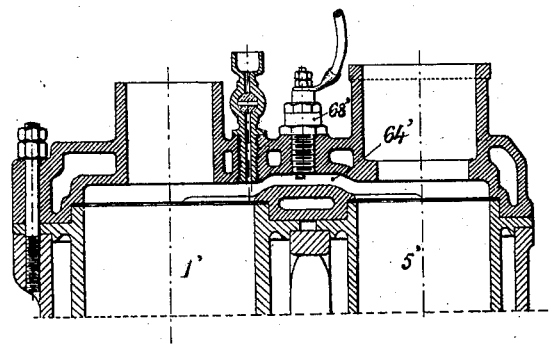
Figure 3:
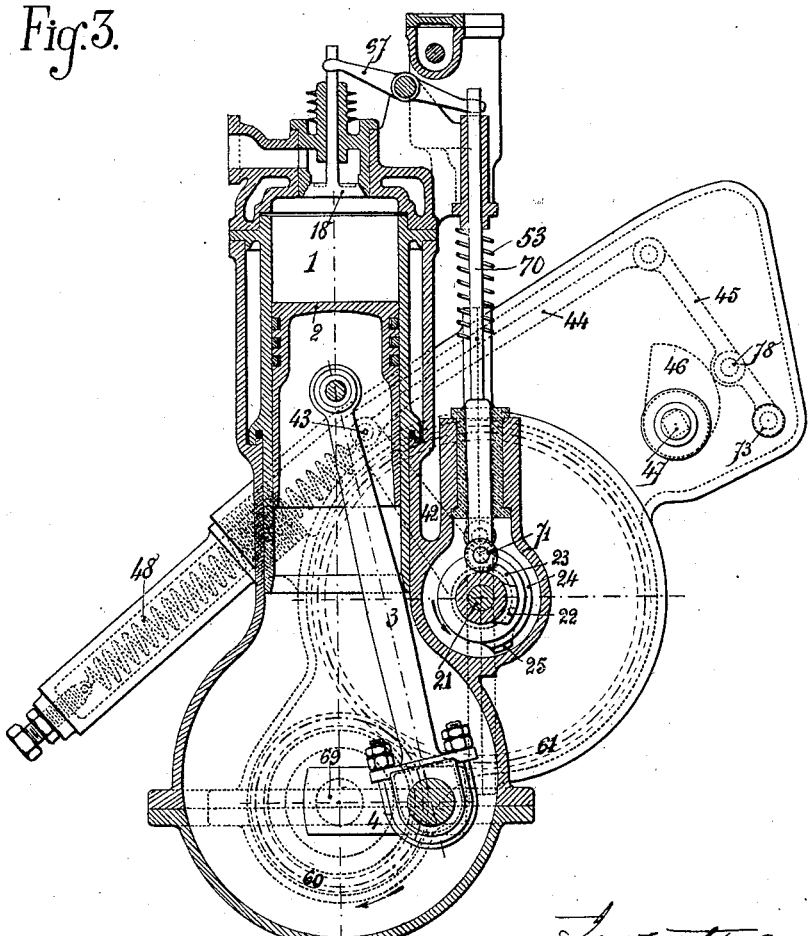

Fig. 1 is a vertical section, partly through one of the compression-cylinders and partly through the cam-shaft, of a motor with two working cylinders, each of which is provided with a compression-cylinder. Fig. 2 is a vertical section through the axis of one of the compression-cylinders and through the mechanism appertaining thereunto. Fig. 3 is a vertical section through the axis of one of the working cylinders. Fig. 4 is a vertical section through the axis of one of the compression-cylinders, the piston of which is shown in a different position to that in Fig. 2. Fig. 5 is a plan of the general arrangement of the motor seen from above with partial horizontal section. Fig. 6 is a section through the axis of one of the working cylinders and through the axis of one of the compression-cylinders, showing the passage of communication between them. Figs. 7 to 10 are diagrammatic views showing the position of the principal parts following the four phases of the cycle. Finally, Fig. 11 is an enlarged section of the arrangement of cams.

The drawings will aid the comprehension of the detailed description which herewith follows.

As will be seen from the annexed figures, working pistons 2 2' are arranged in the cylinders 1 1', hereinafter to be called the "working cylinders," to actuate, through the intermediary of the connecting-rods 3 3', the cranks 4 4', which are keyed and set at three hundred and sixty degrees to one another on the driving-shaft 69. This adjustment of the cranks causes the phases of the cycle to occur in each of the cylinders in the following sequence: in the first cylinder, 1, explosion, exhaust, suction, compression; in the second cylinder, 1', suction, compression, explosion, exhaust.

Compression-cylinders 5 5' are joined to the working cylinders 1 1' and communicate with them through passages 64 64', which open laterally into the bores of the cylinders at their top ends.

The ignition mechanisms 68 68' are situated in the middle of passages 64 64'.

The variation in volume of the compression-cylinders 5 5', and consequently the variation in the power of the motor, is dependent on the variation in the stroke of the pistons 6 6' in these said compression-cylinders 5 5'.

The exhaust in each of the groups formed by a working cylinder and a compression-cylinder is effected by valves 18 18', actuated through the medium of levers 67 67' by rods 70 70'. Springs 53 53' tend to keep the rods 70 70' pressed down, and consequently to close the exhaust-valve. Cams 22 22', mounted on the shaft 21, raise the rods 70 70' when their projections come up against a roller 71, provided at the bottom ends of the rods, open the valves, and maintain each in an open position as long as the corresponding roller rests on the projection of the cam. The admission in each of the groups is effected through valves formed in two parts 19 and 20 19' and 20', actuated against the springs 56 and 57 56' and 57' by the wedge-heads 54 54' of the rod 32, Fig. 1, which rod is caused to move transversely by means of the L-levers 31 31' and the rods 72 72'. The course of the gas may be easily followed from what has already been said and is rendered still clearer by the arrows shown in Figs. 1 and 4.

What there remains to be explained now is the mechanism by means of which the pistons 6 6' of the compression-cylinders are moved and adjusted to different positions for given variations in the power of the motor. This mechanism (illustrated in Figs. 1, 2, and 4 in section) is arranged in a casing situated at the lower end of the compression-chambers 5 5'. It has for its object to suitably transmit the driving-shaft motion to the compression-pistons 6 6', placed in the compression-cylinders 5 5'. This transmission of motion by the hereinafter-described mechanism is effected as follows: Hollow connecting-rods 14 14' are connected to crank-arms 17 17' on the driving-shaft, with which they continuously rotate. In these hollow connecting-rods slide rods 15 15', jointed to levers 66 66', which are in one piece with the slide-guides 11 11'. These slide-guides are mounted to oscillate round fixed centers 12 13 (for 11) or 12' 13' (for 11',) (see Fig. 1,) these centers projecting at $o$ into the mechanism casing, Figs. 2 and 4. In these slides 11 11' slipper-blocks 9 9 10 10 are mounted to reciprocate, and as they move they actuate the head of the connecting-rods 49 49', belonging to the pistons 6 6', and the jaw end of the eccentric rods 8 8', common shafts 7 7' connecting the slipper-blocks and passing through the connecting-rod heads and the eccentric-rod jaws. The oscillation of these slide-guides, which is transmitted to the connecting-rods 49 49' through the medium of the slipper-blocks, effects the ascent and descent of the pistons 6 6'. The amplitude of these oscillations remains constant; but the position of the guides corresponding to the top dead-center position of the pistons 6 6' is always perpendicular to the axis of the compression-cylinder—that is to say, in reference to the figure horizontal. It is clearly seen that the connecting-rods 49 49', which are actuated by the slide between two extreme positions, will never go beyond their lower and upper dead-centers, but will reach them just in the same way as if they had been actuated by a crank making a complete revolution round its driving-shaft.

I have just shown how, through the intermediary of the hollow connecting-rods 14 14' and rods 15 15', the levers 66 66', and of the slides 11 11', the motion of the driving-shaft 69 is transmitted to the connecting-rods 49 49' of the compression-pistons 6 6'.

I am now about to describe how I maintain the compression-cylinder pistons stationary during the explosion and compression periods when they must be held fixed, as will be explained when I pass on to the description of the general working of the motor.

I will take cylinder 5 as a basis for my description, exactly the same operations occurring in cylinders 5', with a difference in the period equal to one revolution of the driving-shaft. I have already said, and refer again to Figs. 2 and 4, that a rod 15, actuating the lever which forms an integral part of the slide 11, is arranged to slide in the hollow connecting-rod 14. This rod 15 is fixed in the connecting-rod 14 during the exhaust and suction periods and follows the motion imparted to it by driving-shaft; but during the explosion and compression periods it is released from the connecting-rod and becomes immovable, while the piston 6 is held stationary. The locking of the rod 15 is effected as follows: I will assume the connecting-rod 14 to be leaving its top dead-center $r$ at the end of an explosion period and commencement of an exhaust period. At this instant the connecting-rod 14 and its rod 15 must become locked together. To effect this, a bent lever 16 65, mounted on the connecting-rod, is held pressed up continuously by means of a spring 62 against a claw 63, provided at the end of the rod 15. The connecting-rod 14, continuing its motion in the direction indicated by the arrow, actuates the lever of the slide 11 for a whole stroke—that is to say, until it reaches its lower dead-center at $q$—making the slide 11 pivot round the center $o$ and causing it to move out of its position of extreme obliquity into a horizontal position corresponding to the upper dead-center of the piston 6 6'. At this moment the exhaust is finished and suction commences in the working cylinder 1 1' and in the compression-cylinder. During the suction-stroke from $q$ to $r$ the connecting-rod 14 swings the slide-guide, moving it out of its horizontal position into its position of extreme obliquity, thus causing the connecting-rod 49 to be drawn down and creating suction in the compression-cylinder. At the end of the explosion period a cam 26, keyed on to the shaft 21, (this shaft, to be described later on, is one to which rotary motion, reduced by one-half, is imparted by the driving-shaft,) comes against a roller 50, mounted in a thrust-pin 74, which latter when actuated by the cam is forced against the end 27 of a bent lever 29, pivoted on a fixed center 75, and which a recoil-spring 51, attached to the side of the casing, tends to bring back to the position shown in Fig. 2. The nose 58 of a bolt 76, mounted in a sleeve 28, which forms an integral part of the lever 29, is held continually projected from its sleeve 28 by means of a spring 59 inclosed in this latter. The action of the thrust-pin has for its object to throw back the combination 28 76 in order to allow the lever 66 to redescend and follow the motion of the connecting-rod 14 and pass in front of the nose 58. The lever 66 must be locked, as I shall hereinafter explain, on the one hand, against a fixed stop 52 and, on the other hand, against the nose 58 during the preceding explosion period. During the whole of the exhaust and suction period the cam 26 passes under the roller 50 and maintains the combination 27 76 in its thrown-back position, thus allowing the tail of the lever 66 to pass at the end of the suction period, when it is pushed by the connecting-rod 14 to rest against a stop 52. As the upper part of the claw of the lever 66 comes in front of the nose 58 the cam 26 releases the roller 50, the lever 29 is returned to the position shown in Fig. 2 by means of the spring 51, the sleeve 28, integral with the lever 29, during this motion sliding on the bolt 76 and compressing the spring 59. The claw of the lever 66 continues to pass in front of the nose 58 until it comes up against the stop 52 and the suction period has terminated; but at this very instant the nose 58, being freed and forced out by the spring 59, engages under the end of the lever 66, which it locks rigidly, as well as the slide 11, of which the said lever forms a prolongation. Consequently the piston 6 is rendered immovable. This seesaw motion of the lever 29 takes place, as I have already remarked, during a brief moment before the dead-center is reached; but at the same time the end 65 of the lever 16 butts against the end of the lever 29 and is caused to oscillate in such a way that its other end releases the claw 63 of the rod 15. At this instant and in consequence of this release the rod 15 ceases to be locked as one with the connecting-rod 14, the liberation of the rod 15 being effected slightly before the top dead-center is reached by the connecting-rod 14 at the moment at which the compression period is about to commence. During this compression period the connecting-rod 14, which continues to be actuated by the driving-shaft, proceeds to finish a stroke from $r$ to $q$; but the rod 15, coupled to the slide 11 and being locked and held in position by the nose 58 engaging under the lever 66, will remain immovable, the hollow connecting-rod 14 sliding on it. Consequently, as has already been mentioned, the immovability of the piston 6 is assured during the compression period. During the following stroke of the connecting-rod 14, this stroke corresponding to the explosion period, the connecting-rod 14, which still remains independent of the rod 15, slides on this rod; but shortly before it reaches its top dead-center at $r$ the cam 26 again comes up against the roller 50, thus effecting the withdrawal of the nose 58 of the bolt 76 from beneath the lever 66, causing the lever 27 29 to pivot against the action of the recoil-spring 51. The tail 29 of this lever is then moved to the position shown in Fig. 4, thus preventing its coming again into contact with the nose 65 of the lever 16, which latter then falls onto the claw 63 of the rod 15, thus locking it to the hollow connecting-rod 14. This motion synchronizes with the end of the explosion period. The same movements corresponding to the same phases of the cycle are then repeated indefinitely.

I have successively demonstrated, first, how the motion is transmitted from the driving-shaft to the connecting-rods belonging to the pistons 6 6′; secondly, how the compression-cylinder pistons are locked in position during the explosion and compression periods.

I am now going to show how and by what means I vary the cylindrical volume in the compression-cylinders, the said variation having for its object to effect corresponding variation in the power of the motor.

I know that the shafts 7 7′, which pass through the heads of the connecting-rods 49 49′ and connect the slipper-blocks 9 9 10 10, also pass through the jaws of eccentric-rods 8 8′, whose sheaves are keyed on a shaft 47. (Shown in plan in Fig. 5.) It will be seen immediately that any motion of the shaft 47 is imparted to the eccentric, and this in turn will transmit the motion to the slipper-blocks and the connecting-rod head in the slides 11 11′. A variation in the position of the lower dead-center of the pistons 6 6′ is a necessary consequence entailing a corresponding variation in the volume of the compression-cylinder. When by actuating the shaft 47 by means of a lever 77, working in a notched quadrant, the shaft 7, and with it the heads of the connecting-rods 49 49′, are brought into the position at $o$, the volume of the compression-cylinders 5 5′ is reduced to a minimum, (theoretically to zero.) When, on the other hand, the shaft 7 is moved to $p$, the stroke of the pistons 6 6′ attains its maximum, and consequently the volume of the compression-cylinders at the end of the suction period is at its greatest.

It is as well to remark here that as the amplitude of oscillation of the slide-guides is constant and as the said guides always bring the head of the connecting-rod 49 back again till it lies on the same perpendicular to the cylinder-axis, and when this connecting-rod has reached its top dead-center no sensible alteration in the position of this top dead-center is effected when the head of the connecting-rod 49 is moved from $o$ to $p$. I might even say that the variation of position of the upper dead-center is practically equal to nothing if the length of the connecting-rod 49, on the one hand, be taken into consideration and, on the other hand, the comparatively short length of the slide-guide, whereas there is an important variation, as I have just shown, in the position of the lower dead-center.

I have just reviewed the arrangement and details of the working cylinders, the compression-cylinders, and the admission and exhaust valves. I have described the mechanism for transmitting motion from the driving-shaft to the pistons of the compression-cylinders and how these said pistons are intermittently locked and held in position.

I am now about to pass on to a detailed description of the elements which control the opening and closing of the admission and exhaust valves at their appointed times. These elements consist of cams mounted symmetrically for each cylinder group on a shaft 21, parallel to the driving-shaft, and which I will hereinafter designate as the "cam-shaft." These cams being symmetrical in relation to the axis of the two cylinder groups, I will only refer to those belonging to the cylinder groups 1 and 5.

Motion is transmitted from the driving-shaft 69 to the cam-shaft in the following manner: A pinion 60, keyed onto the driving-shaft 69, gears with a wheel 61, keyed onto the cam-shaft. The diameter of the wheel 61 being twice as big as that of the pinion 60, the cam-shaft rotates at half the speed of the driving-shaft, and the absence of intermediate gear-wheels causes these two shafts to revolve in opposite directions. There are four of these cams, two for the exhaust, two for admission, and a fifth cam, 26, keyed directly on the shaft of which I have already spoken, and which controls, as I have seen, the thrust-pin with cam-roller 50, which in its turn plays a part in the action of the compression connecting-rods and pistons. The cams actuating the exhaust-valves are referred to with the reference-numerals 22 and 23. The cam 23 forms an adjustable cam. The cams controlling the suction-valves are 24 and 25, the cam 24 being one to which lead may be given.

When the power of the motor has been altered, the function of the cams 23 and 24 is, first, in the control of the exhaust to lengthen the profile of the cam in the same direction as the shaft 21 rotates in such a manner that the exhaust commences before the finish of the explosion-stroke, this advance of the exhaust taking place in inverse ratio to the volume of the compression-chamber for the purpose of obviating, as we have already said at the beginning of the specification, any negative work of the working piston; secondly, in the control of the suction to hasten the moment at which the roller 30, (which controls the admission-valve,) is raised, when consequently the rod 32, actuated by the lever 31, will cause, before the end of the suction-stroke, the valves 19' and 20' to fall onto their seat, (the valves 19 and 20 being controlled in respect to their fall by the roller 30.')

For a full charge the profile of the cam 23 coincides with that of cam 22. It only enters into action when the power of the motor is to be varied. I am now going to explain these different cams in detail and show how the adjustable cams fulfil the double function above mentioned. The cam 23 is formed in one piece with the cam 24. These two cams (adjustable cams) to which lead may be given are mounted with slight friction on the cam 25 and the cam 22. They can be actuated to rotate relatively round the cams 25 and 22; but a segment 33 prevents any lateral motion on the cams in the direction of the axis of the shaft 21. On the other hand, the cam 22 (which is in one piece with the cam 26) is held on the shaft 21 by means of the pin 34. As the cams 23 and 24 cannot move laterally on the cam 22, the consequence is that on account of the pinning of this cam 22 the said cams 23 and 24 have no lateral motion in relation to the shaft 21 itself. The sleeve common to the two cams 23 24 is internally threaded and forms a nut screwing onto the screw-sleeve 35. This screw-sleeve 35 is coupled to rotate with the shaft 21, but can be moved laterally to and parallel to the axis of the same, being only connected to it by means of a feather-key 36, working with slight friction. The cam 25 is mounted on and keyed with slight friction to the screw-sleeve 35. This key causes the rotary motion of the shaft 21 to be imparted to the screw-sleeve 35; but it cannot move laterally, as it butts up on the one side against the cam 23 24 and on the other side against the cheek of the bush 40. The screw-sleeve 35 is provided with a neck into which projects a flange 37, secured to the nut 38, which is prevented from rotating by means of a feather 39, sliding in a keyway in the fixed bush 40, but which permits it to move laterally in a direction parallel to the axis of the shaft 21. Finally, a screw-sleeve 41, which being loose can turn on the shaft 21, is provided inside the nut 38. This screw-sleeve carries a lever 42, which is in rigid connection, through the medium of a shaft 43, with a symmetrical corresponding lever 42', belonging to the other group of cams. It will be immediately seen that an angular motion of this lever 42 will cause the following movements: the rotation of the screw-sleeve 41, lateral displacement of the nut 38, mounted on this screw-sleeve, the lateral displacement of the screw-sleeve 35 through the medium of the flanged part 37, rotary motion of the nut 24, mounted on this screw-sleeve, and consequent unkeying of the cams 24 23 on this said nut. It is quite clear that these two results I have just mentioned are effected by this angular motion of the lever 42—that is to say, that any movement of this lever causes the cams 23 24 to be simultaneously unkeyed in such a manner that, first, the doubling exhaust-cam 23 is unkeyed and tends to lengthen the profile of the exhaust-cam 22; secondly, the adjustable admission-cam 24 (which, as I have already said, has its own particular profile) is also simultaneously unkeyed, thus altering the course of its profile under the roller 30.

I have still to explain how the unkeying of the cams controlling the time of opening and closing of the admission and exhaust valves is made to synchronize with the variations in the stroke of the compression-cylinder pistons, which I have already described. The relationship between these motions is attained by causing the movements of the levers 42 42', which control the cams, to be controlled by the same shaft 47, which shaft, as I have already seen, controls the variations in the length of the stroke of the compression-pistons. The connection is effected as follows: On the shaft 43, which connects the two levers 42 42', is coupled a system of links 44 45, which pivots round a fixed center 73. A spring 48, secured to a point on the mechanism casing and to the end common to the lever 42 and arm 44, tends to constantly press the roller 78, mounted on the arm 45 against the periphery of a cam 46, keyed onto the shaft 47. From this it is apparent that any angular motion imparted to this shaft 47 involving an alteration in the volume of the compression-chambers also entails, through the medium of the cam 46 and the system 45 44 and 42 42', a corresponding angular displacement of the cams 23 24 23' 24'. It is absolutely necessary to insure that the motor shall work well that for equal variations in the volume of the compression-chambers corresponding equal angular variations of the cams on the shaft 21 are effected. This result is easily attained by making the cam 46 with a suitable profile.

Having now described in detail and separately the various elements of the motor, I am now going to explain its action during the four phases of the cycle, referring to the diagrammatic Figs. 7, 8, 9, and 10.

I will assume to show how all the parts act that the motor is running at half-power. Let us see how I effect the reduction from full to half power. To attain this reduced power, I actuate the lever 77, moving it in the direction of the arrow A (see Fig. 4) to the middle of its travel. This movement of the lever 77 and the consequent motion of the shaft 47 has two effects. First, it alters the position, as has been explained, of the slipper-blocks 9 10 in the slide-guides 11 11' through the medium of the eccentric 8 8' and causes them to leave the position $p$ and move to the center of the travel $p$ $o$. (This is the exact position of the slipper-blocks, as shown in Figs. 2 and 4.) This, as I have said, reduces the volume of the compression-chamber by one-half at the same time as the pistons 6 6' reach their lower dead-center positions—that is to say, the volume of the cylinder is reduced by one-half. Secondly, it causes through the intermediary of the cam 46 and link system 45 44 43 the unkeying of the cams 23 and 24 in the direction of rotation of the shaft 21. The profile of the cam 46 being calculated, as has already been said, in such a manner that for equal variations in the volume of the cylinders corresponding equal angular variations are effected in the cams, and the cams 23 24 will be advanced on the shaft 21 for half the distance of their total travel. This has the following results: On the one hand, the profile of the exhaust-cam 22 22' is lengthened by a half through the medium of the cam 23 23'; and consequently the exhaust-valve will remain open for a period one and a half times as protracted as its preceding open period. At the same time, however, as it is the cam 23 which is advanced, the cam 22 remaining fixed, the end of the exhaust always takes place at the same moment as before the reduction of the charge—that is to say, when the working pistons and compression-pistons reach their upper dead-centers. On the other hand, the suction-cam 24 24' is advanced a distance equal to the half of its total travel. It has thereby hastened the closing of the suction-valves 19' 20' (19 20) and reduces the duration of the suction period by one-half. Having effected this reduction of power, as explained, let us examine the action of the motor.

Figure 7:
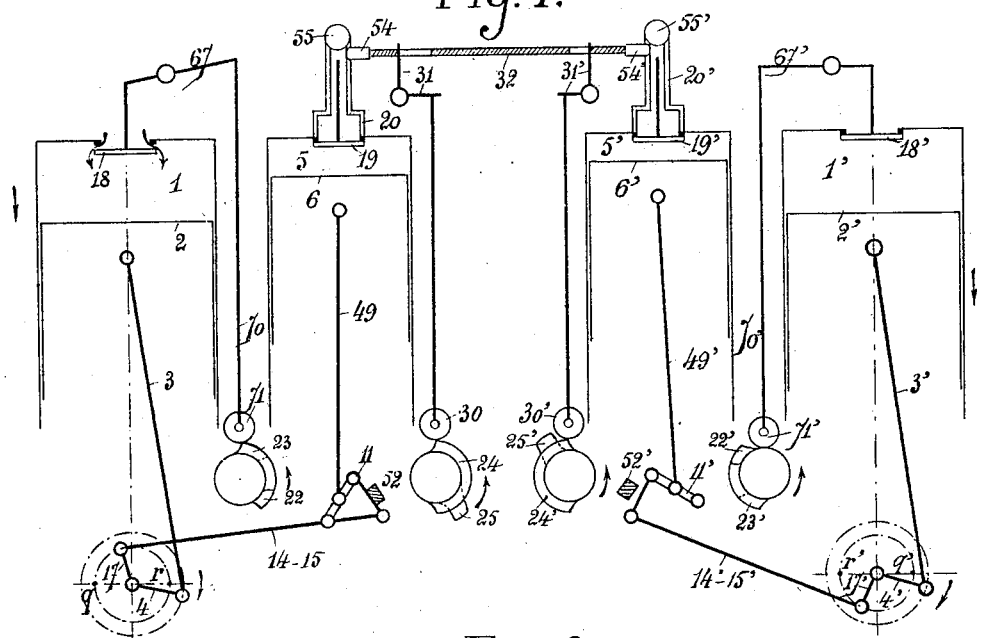

First period, Fig. 7: Group 1 5 is exhausting and group 1' 5' is compressing. In the working cylinder 1 of group 1 5 exhaust has begun at the middle of the explosion-stroke in consequence of the advance of the cam 23, which has just raised the roller 71 and the rod 70. As long as the piston 2 of the cylinder 1 has not yet reached its lower dead-center, and consequently the connecting-rod 14 has not reached its upper dead-center $r$, the compression-piston remains immovable, the lever of the slide-guide 11 being held fixed against the stop 52. When the piston 2 of the cylinder 1 has reached its lower dead-center, the latching of the hollow connecting-rod 14 and of the rod 15 is effected, as well as the liberation of the lever 66 of the slide-guide 11. The movement of rotation continuing, the compression-piston reascends at the same time as the working piston 2, and the expulsion of the burned gases is effected. During this period the exhaust-cams 23 and 22 have passed underneath the roller 71, and when the pistons have reached their upper dead-centers the cam 22 lets the roller 71 fall back, thus closing the exhaust-valves 18. As regards the admission-cams, those of the group 1' and 5' have not actuated the valves 19 and 20. Those of group 1 5 have only been the means of causing the nose 54 to approach the end of these valve-spindles, as shown in Fig. 7. In the group 1' 5' the piston is continuing to descend; but the suction has been cut off at half-stroke by the cam 24 of group 1 5, which engaging under the roller 30 has caused the rod 32 to move to the left, thus withdrawing its nose 54' from between the ends of the valves 20' and 19', (without, in spite of this, as I have already said, opening the valves 19 and 20,) and thereby permitting these said valves to shut. As long as the piston 2' has not reached its lower dead-center, and consequently the connecting-rod 14' has not reached its upper dead-center at $r$, the compression-piston continues to descend simultaneously with the working piston 2'. When the piston 2' reaches its lower dead-center, the connecting-rod 14' simultaneously reaches its upper dead-center. The unlatching of this hollow connecting-rod with the rod 15' is effected, and the lever 66' of the slide-guide 11' is locked against the stop 52'. The compression-piston 6' is then locked, and the working piston 2' continuing to rise the compression commences. During the whole of this period the exhaust-cams 23' and 22' remain out of action. As regards the admission-cams, those of group 1 and 5 have continued to leave the admission-valves 19' 20' shut. When the working piston 2' has reached its upper dead-center, (at the same time as the working piston 2,) the compression is finished and all the elements of the group 1' 5' occupy the positions as shown in Fig. 8.

Figure 8:
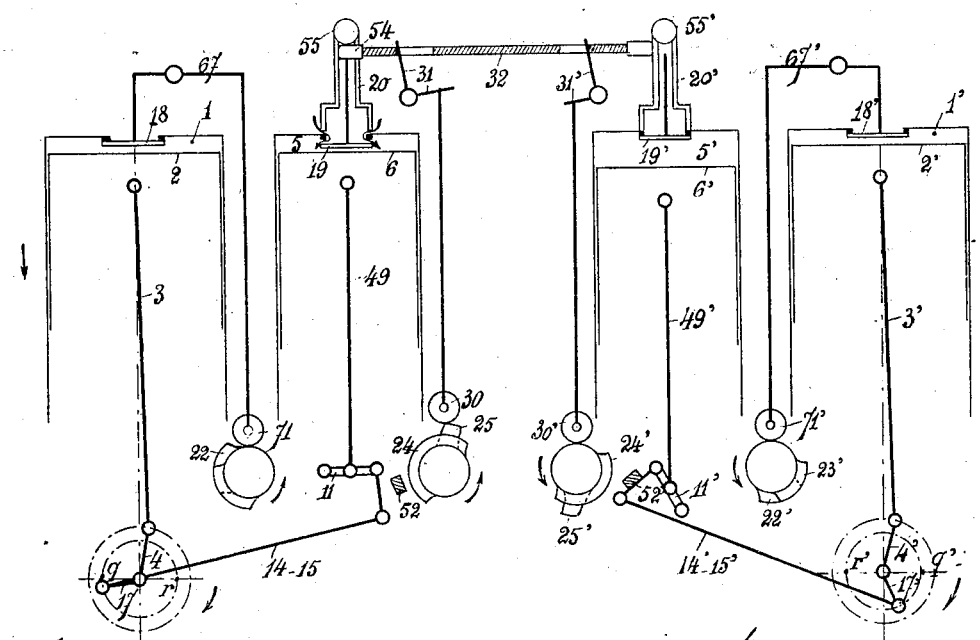
Figure 9:
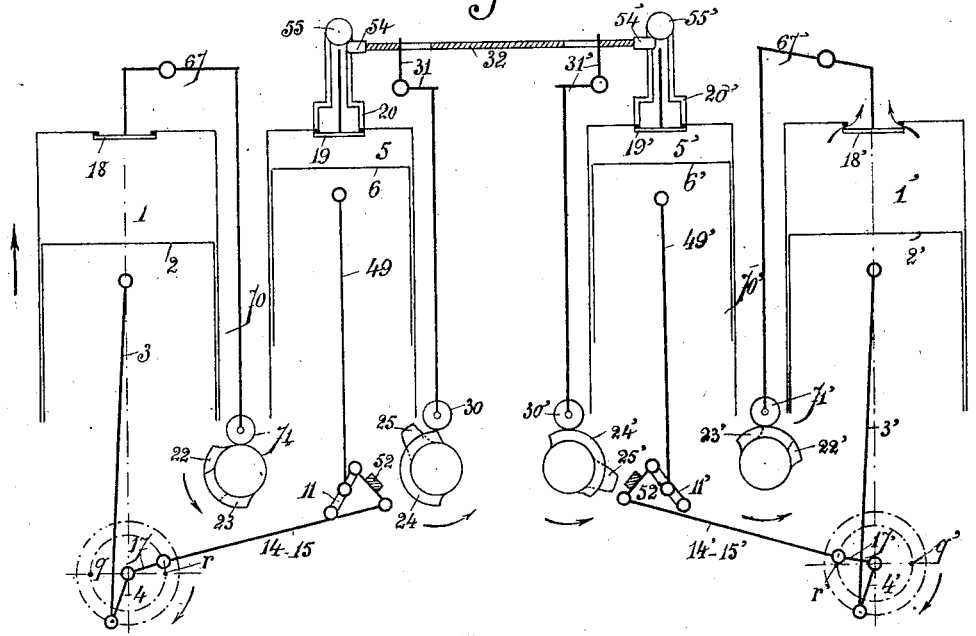
Figure 10:
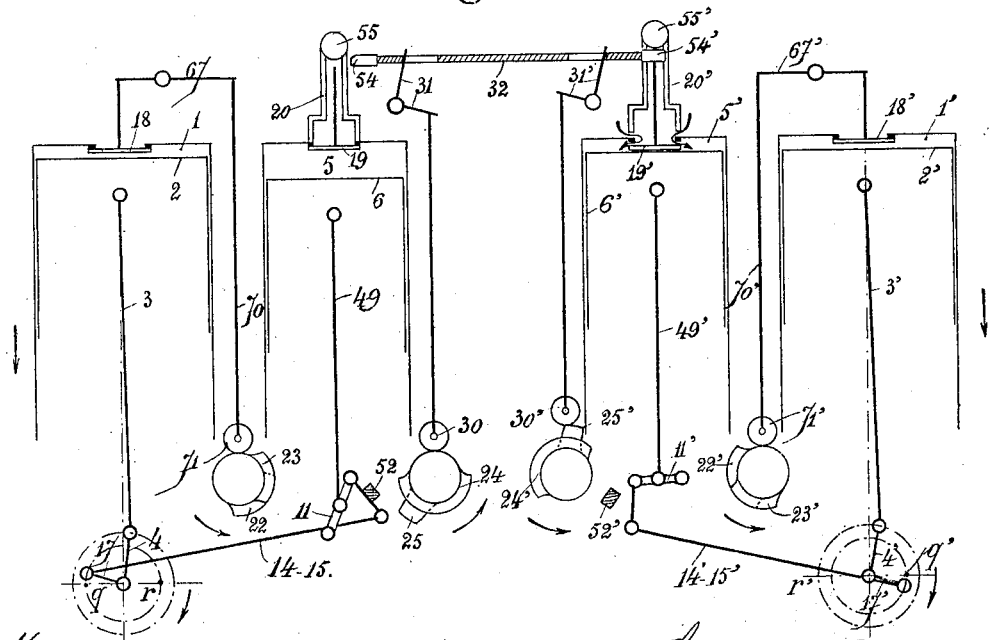

Second period, Fig. 8: The group 1 5 proceeds to the suction period and the group 1' 5' to the explosion period. In the working cylinder 1 of group 1 5 suction begins, the piston 2 leaves its upper dead-center position and the piston 6 as well. The pistons 2 and 6 descend simultaneously. The exhaust-cams 23 22, which have released the roller 71 and allowed it to fall back, continue their rotary motion without any further action. As regards the admission-cams, those of the group 1' 5' have passed the roller 30', thus allowing the rod 32 to be moved a considerable distance to the left, this motion being produced by the cam 25 of the group 1 5, which engaging underneath the roller 30 forces the nose 54 between the ends of the valves 19 and 20, thus completely opening them. At half-stroke of the piston 2 the cams 24 and 25 release the roller 30, allowing the cam 24' of the group 1' 5' by engaging under the roller 30' to withdraw the nose 54 and permit the suction-valves to close. When the pistons 2 and 6 have reached their lower dead-centers, all the elements of group 1 5 occupy the positions as shown in Fig. 9. In the group 1' 5' explosion is effected, piston 2' sinks. As long as this piston has not reached its lower dead-center the compression-piston 6' remains immovable; but at half-stroke of the piston 2' the exhaust-valve 18' opens under the action of the cam 23'. As regards the admission-cams, neither those of the group 1' 5' nor those of the group 1 5 actuate the valves 19' and 20', which remain closed. When the working piston 2' reaches its lower dead-center, the hollow connecting-rod 14' also reaches its upper dead-center position, latched to the rod 15' at the same moment, while simultaneously the lever 66' of the slide-guide 11' is liberated and the compression-piston 6' is about to ascend at the same moment as the working piston 2 to expel the gases. In this lower dead-center position all the elements are in the positions as shown in Fig. 9.

Third period, Fig. 9: In group 1 5 compression is commencing and in group 1' 5' expulsion. The pistons of both groups excepting the piston 6, which remains fixed, are reascending.

Fourth period: Explosion takes place in group 1 5 and suction in the group 1' 5'. The piston of the working cylinder belonging to the group 1 5 is descending. As long as this piston has not reached its lower dead-center the compression-piston 6 remains at rest; but at half-stroke the exhaust-valve 18 opens under the action of the cam 23. As regards the admission-cams, neither these of group 1 5 nor those of group 1' 5' actuate the valves 19 and 20, which consequently remain shut. When the working piston 2 reaches its lower dead-ecnter, the hollow connecting-rod 14, which attains its upper dead-center, latches with the rod 15, and the lever 66 of the slide-guide being simultaneously freed the compression-piston 6 can reascend for the exhaust. In the working cylinder 1' of the group 1' 5' suction commences. The working piston 2' leaves its upper dead-center and the compression-piston also. The two pistons descend simultaneously. The exhaust-cams 23' 22', which have released and allowed the roller 71' to fall, continue their motion without further action. As regards the admission-cams, those of the group 1 5 have passed the roller 30, which falls, thus allowing the rod 32 to move to the right, this movement being effected by the cam 25' of the group 1' 5', which, engaging under the roller 30', causes it to rise. The rod 32, pushed toward the right, projects the nose 54' between the ends of the valve 19' and 20', thus completely opening them. At half-stroke of the working piston 2' the cams 24' and 25' release the roller 30', allowing the cam 24 of the group 1 5 to engage under the roller 30 to withdraw the nose 54' and to thus close suction-valves. When the pistons 2 and 2' are at half-stroke, we return to that phase of the cycle illustrated in Fig. 7.

The action of the parts when running at full power will be understood after what has been already said, as it is just the same as when running at reduced power excepting as regards the adjustable exhaust-cam 23 and detachable admission-cam 24. In these two cases the compression-cylinder pistons and the working pistons arrive simultaneously at their top and bottom dead-centers except for the compression and explosion periods, during which one or other of the compression-cylinder pistons remains fixed at its lower dead-center position. In these two cases also the arrival of the compression-cylinder pistons at their lower dead-centers coincides with the arrival of the hollow connecting-rods 14 14' and their sliding rods 15 15' at their upper dead-centers, and vice versa.

The advantages of a motor as described above are easily conceived. It has all the elasticity of a steam-motor, although any speed mechanism is dispensed with, and finally, thanks to the complete expulsion of the consumed gases, it effects a saving of more than twenty-five per cent.

Having now fully described and ascertained the nature of my said invention and in what manner the same is to be performed, I declare that what I claim is—

1. In a four-stroke-cycle explosion-motor, a working cylinder and its piston, a compression-cylinder communicating with the working cylinder, a piston in the compression-cylinder and a piston-rod therefor, a crank pin or arm to which the piston-rod is connected, means for oscillating said crank-arm on its axis to move the piston-rod and its piston, and adjusting means for moving said crank arm or pin toward or from its axis of oscillation thereby varying the amplitude of the stroke of the compression-chamber piston.

2. In a four-stroke-cycle explosion-motor, a working cylinder and its piston, a compression-cylinder communicating with the working cylinder, a piston in the compression-chamber, means for imparting suction and exhaust strokes to said piston, and means automatically locking said piston against movement during the compression and explosion strokes of the piston in the working cylinder.

3. In a four-stroke-cycle explosion-motor, a working cylinder and its piston, a compression-cylinder communicating with the working cylinder, a piston in the compression-chamber, means for imparting suction and exhaust strokes to said piston, means for varying the amplitude of said suction and exhaust strokes, and means automatically locking said piston against movement during the compression and explosion strokes of the piston in the working cylinder.

4. In a four-stroke-cycle explosion-motor, a working cylinder and its piston, a compression-cylinder communicating with the working cylinder, a piston in the compression-cylinder and a piston-rod therefor, a crank pin or arm to which the piston-rod is connected, means for oscillating said crank-arm to impart suction and exhaust strokes to said piston, and means automatically locking said crank-pin against movement during the compression and explosion strokes of the piston in the working cylinder.

5. In a four-stroke-cycle explosion-motor, a working cylinder and its piston, a compression-cylinder communicating with the working cylinder, a piston in the compression-cylinder and a piston-rod therefor, a crank arm or pin to which the piston-rod is connected, means for oscillating said crank-arm to impart suction and exhaust strokes to said piston, means for moving said crank arm or pin toward or from its axis of oscillation thereby varying the amplitude of stroke of the compression-chamber piston, and means automatically locking said crank-pin against movement during the compression and explosion strokes of the piston in the working cylinder.

6. In a four-stroke-cycle explosion-motor, a working cylinder and its piston, a compression-cylinder communicating with the working cylinder, a piston in the compression-cylinder and a piston-rod therefor, a crank-pin to which the piston-rod is connected, an oscillatory crank-arm on which the crank-pin is movable, means under control of an operator for moving said pin on said arm toward or from the axis of oscillation thereby varying the amplitude of the stroke of the compression-chamber piston, an extension on the crank-arm, a stop with which said extension contacts to limit the movement of the crank-arm in one direction, an automatically-operating locking device locking the extension against said stop during the compression and explosion strokes of the piston in the working cylinder, and means automatically disengaging said locking device and oscillating the crank-arm to impart exhaust and suction strokes to the compression-cylinder piston.

7. In a four-stroke-cycle explosion-motor, a working cylinder and its piston, a compression-cylinder, a piston in the compression-cylinder and a piston-rod therefor, a crank-pin to which the piston-rod is connected, a driving-shaft, and a connecting-rod for oscillating the crank-pin from the driving-shaft comprising two parts movable one upon the other one part being connected to the driving-shaft and the other the crank-pin, an automatically-operating locking device for locking the parts of said connecting-rod together against relative movement whereby it is caused to impart movement to the crank-pin, automatically-operating releasing means throwing said locking device out of operative position and permitting relative movement of the parts of the rod so that no movement is imparted to the crank-pin.

8. In an explosion-motor, a working cylinder and its piston, a compression-chamber in communication with the working cylinder, an exhaust-port for said cylinder and chamber, a valve controlling the opening of said port, actuating means for opening said valve, and means increasing or decreasing the size of the compression-chamber and for correspondingly advancing or retarding the operation of the valve-actuating means.

9. In an explosion-motor, a working cylinder and its piston, a compression-chamber, an inlet-port and a valve controlling the same for admitting explosive charge to the cylinder and chamber, means for increasing or decreasing the size of the compression-chamber, valve-operating means for opening the inlet-valve and for controlling the closing thereof, and means for advancing the action of said valve-operating means in closing the valve according to diminution in the size of the compression-chamber and for retarding said action in closing the valve according to increase in the size of the chamber.

10. In an explosion-motor, a working cylinder and its piston, a compression-chamber in communication with the working cylinder, an exhaust-port and an inlet-port for said cylinder and chamber, valves controlling the opening of said ports, actuating means for opening the exhaust-valve, valve-operating means for opening the inlet-valve and for controlling the closing thereof, means for increasing or decreasing the size of the compression-chamber, means for advancing or retarding the operation of the exhaust-valve-operating means according to increase or decrease in the size of the compression-chamber and means for advancing the action of said inlet-valve-operating means in closing the valve according to decrease in the size of the compression-chamber and for retarding said action in closing the valve according to increase in the size of said chamber.

11. In a four-stroke-cycle explosion-engine, a working cylinder and its piston, a compression-cylinder in communication with the working cylinder and a piston therefor, driving means for imparting exhaust and suction strokes to the compression-chamber piston, automatically-operating locking means for locking said piston against movement during the explosion and compression strokes of the working-cylinder piston, an exhaust-port and an inlet-port for the cylinders, valves controlling the opening of said ports, actuating means for opening the exhaust-valve, valve-operating means for opening the inlet-valve and for controlling the closing thereof, and means under control of an operator and acting in conjunction with the compression-cylinder piston, the exhaust-valve-actuating means and the inlet-valve-operating means for simultaneously increasing the amplitude of stroke of said piston and advancing the operation of the exhaust-valve-operating means and the action of the inlet-valve-operating means in closing the inlet-valve, or for simultaneously decreasing the amplitude of the stroke of said piston and retarding the operation of the exhaust-valve-operating means and the action of the inlet-valve-operating means in closing the inlet-valve.

12. In an explosion-motor, a working cylinder and its piston, a compression-cylinder and its piston, a crank to which the compression-cylinder piston is connected, a driving-shaft, a connecting-rod consisting of two parts slidable upon each other, one connected to the driving-shaft and the other to the crank, means for locking the parts together to impart movement to the compression-piston during the exhaust and admission strokes and for automatically releasing said locking means to permit relative movement of the parts of the piston-rod, whereby the compression-piston may remain fixed during the compression and explosion strokes.

13. In an explosion-motor, a working cylinder and its piston, a crank to which the compression-cylinder piston is connected, a driving-shaft, a connecting-rod consisting of two parts slidable upon each other, one connected to the driving-shaft and the other to the crank, a hook on one part adapted to engage the other part to lock the two together to impart compression and exhaust strokes to the compression-cylinder piston, and means for automatically throwing said hook out of engagement and prevent the transmission of movement to said piston during the compression and explosion strokes of the engine.

14. In an explosion-motor, a working cylinder and its piston, a crank to which the compression-cylinder piston is connected, a driving-shaft, a connecting-rod consisting of two parts slidable upon each other, one connected to the driving-shaft and the other to the crank, a hook on one part adapted to engage the other part to lock the two together to impart compression and exhaust strokes to the compression-cylinder piston, a spring-actuated rocking arm or lever, a bolt at one end thereof for locking the crank against movement, and means for rocking the arm to withdraw said bolt from its locking position and to move the other end of the arm into position to release the hook which locks the two parts of the connecting-rod together.

15. In an explosion-motor, a working cylinder and its piston, a crank to which the compression-cylinder piston is connected, a driving-shaft, a connecting-rod consisting of two parts slidable upon each other, one connected to the driving-shaft and the other to the crank, a hook on one part adapted to engage the other part to lock the two together to impart compression and exhaust strokes to the compression-cylinder piston, a spring-actuated rocking arm or lever, a bolt at one end thereof for locking the crank against movement, a cam-shaft driven from the motor-shaft at a slower speed, and a cam on said cam-shaft for rocking the arm to withdraw said bolt from its locking position and to move the other end of the arm into position to release the hook which locks the two parts of the connecting-rod together.

16. In an explosion-motor, a working cylinder and its piston, a compression-chamber in communication with the working cylinder, means for varying the capacity of the compression-chamber, an inlet-valve, an exhaust-valve, adjustable cams for opening said valves, and means for adjusting said cams to lengthen or shorten the duration of opening of the valves in correspondence with variations in the capacity of the combustion-chamber.

17. In an explosion-motor, a working cylinder and its piston, a compression-chamber in communication with the working cylinder, means for varying the capacity of the compression-chamber, an inlet-valve, an exhaust-valve, a cam for opening each valve comprising two members, and means for adjusting one member of each cam to lengthen or shorten the duration of opening of the valve in correspondence with variations in the capacity of the combustion-chamber.

18. In an explosion-motor, a working cylinder and its piston, a compression-cylinder and its piston, an inlet-valve, an exhaust-valve, a two-membered cam for opening each valve, and means under control of the operator for varying the amplitude of the stroke of the compression-cylinder piston and for simultaneously adjusting one member of each cam to lengthen or shorten the duration of opening of the valves in correspondence with variations in the amplitude of the piston-stroke, whereby the volume of explosive charge admitted may be directly proportioned to the capacity of the compression-chamber.

19. In an explosion-motor, a working cylinder and its piston, a compression-cylinder and its piston, an inlet-valve, an exhaust-valve, a two-membered cam for opening each valve, a cam-shaft with which the cams rotate, an adjustable crank for operating the compression-cylinder piston, and an operating-lever accessible to the operator for adjusting the crank to vary the amplitude of stroke of the compression-cylinder piston and the capacity of said cylinder and for simultaneously adjusting one member of each cam about its shaft to lengthen or shorten the duration of opening of the valves in direct proportion to changes in the capacity of said compression-chamber.

20. In a four-stroke-cycle explosion-motor, two working cylinders and pistons therefor, an inlet-valve for each cylinder, and valve-operating means comprising cams and connections arranged to open one valve while the other is closed and vice versa, whereby when admission takes place in one working cylinder explosion takes place in the other.

21. In a four-stroke-cycle motor, two working cylinders and pistons therefor, an inlet-valve for each cylinder, and valve-operating means comprising a reciprocatory rod movable in one direction to open one valve and permit closure of the other, and vice versa, and cams for actuating said rod, whereby when admission takes place in one cylinder explosion takes place in the other.

22. In an explosion-motor, valves and means for operating the same comprising two cams on the shaft each having a fixed part and a relatively adjustable part on a common sleeve about the shaft between the fixed parts, a second sleeve longitudinally movable but not rotatable on the shaft and having a projection engaging a spiral groove in the adjustable sleeve, and means under control of the operator for longitudinally moving the second sleeve.

In testimony whereof I have signed this specification in the presence of two subscribing witnesses.

RENÉ ALGRIN.

Witnesses:
DOUMÉ CASALONGA,
EDWARD P. MACLEAN.